United States Patent [19]

Mossman et al.

[11] 4,227,368
[45] Oct. 14, 1980

[54] GATHERER SHEET ARRANGEMENT FOR A ROW CROP HARVESTING HEADER

[75] Inventors: Michael W. Mossman, Rock Island; Glen W. Rohweder, Moline, both of Ill.

[73] Assignee: Deere & Company, Moline, Ill.

[21] Appl. No.: 58,690

[22] Filed: Jul. 18, 1979

[51] Int. Cl.³ .............................................. A01D 45/02
[52] U.S. Cl. ..................................... 56/106; 56/320.1
[58] Field of Search ................... 56/105, 106, 98, 119, 56/320.1

[56] References Cited

U.S. PATENT DOCUMENTS

| | | | |
|---|---|---|---|
| 2,549,999 | 4/1951 | Andrews | 56/106 |
| 3,271,940 | 9/1966 | Ashton et al. | 56/105 |
| 3,646,737 | 3/1972 | Grant | 56/106 |
| 3,765,157 | 10/1973 | Hyman et al. | 56/105 |
| 3,982,384 | 9/1976 | Rohweder et al. | 56/106 |
| 4,086,749 | 5/1978 | Greiner et al. | 56/106 |

Primary Examiner—Paul J. Hirsch

[57] ABSTRACT

A row crop header for mounting on the front of a combine has a transversely elongated main frame and a plurality of forwardly extending transversely spaced row units, each row unit being independently floatably supported by the frame. Each row unit has a forwardly and downwardly inclined frame with a top surface and a central fore-and-aft trough which forms the bottom of a fore-and-aft passageway. A pair of endless, flexible conveyor members are mounted on each row unit frame adjacent the top surface and have rearwardly moving inter-meshing inner runs on opposite sides of the passageway, a rotary cutting device being provided on the underside of the row unit frame adjacent the forward ends of the conveyor members for severing the crop from the field. A transverse conveyor spans the rearward ends of the row units for conveying gathered material to a feeding unit for delivery to a processing unit on the combine. A hood or gatherer sheet assembly in each row unit is composed of left and righthand portions, one on each side of the fore-and-aft passageway respectively, each portion being pivotable about a fore and aft axis and being releasably secured by spring latches.

7 Claims, 4 Drawing Figures

GATHERER SHEET ARRANGEMENT FOR A ROW CROP HARVESTING HEADER

BACKGROUND OF THE INVENTION

This invention relates to a harvesting header for a combine or the like and more particularly to a multi-row, row crop harvesting header and an improved gatherer sheet arrangement for such a machine.

It is known in headers for harvesting row crops to provide hoods or gatherer sheets spanning the spaces between the crop receiving passageways of adjoining row units for the purposes of shielding some functional components and for guiding and controlling crop material as it is gathered by the advancing machine. It is also known in a header where adjoining row units are mounted for independent vertical floating adjustment to form such a hood or gatherer sheet assembly in two portions, one carried by each of the adjoining row units and shaped so that there is a narrow fore-and-aft extending gap between them permitting relative noninterfering vertical movement of the adjoining row units. A row crop header and gatherer sheet assemblies of this type are shown in U.S. Pat. No. 3,982,384, Rohweder and Hengen, also assigned to the assignee of the present invention.

It is also known to make such gatherer sheet assemblies detachable for servicing of the row units, for operations such as adjustment of gatherer chains or belts or lubrication of components. The gatherer sheets may be attached to sub-frame members by conventional threaded fasteners often awkward to reach and manipulate. In another form, the gatherer sheet assemblies may be retained on the row unit sub-frame by more readily releasable fasteners. However, with the two types of gatherer sheet assembly described, access is gained only by completely removing the typically awkward and heavy gatherer sheet assembly, with the inconvenience of handling it and the need to find a suitable laydown area for it while it is removed from the machine, plus the possibility that it will become misplaced or damaged while separated from the machine. In addition, reinstallation of such gatherer sheet assemblies again requires man-handling of the gatherer sheet assembly and the typical difficulty of aligning, mating, latching or supporting parts which, perhaps, have become distorted through careless handling or fouled or blocked by foreign material.

It is also typically important for good function of the harvester header for an inner edge of the gatherer sheet assembly adjacent the crop material passageway to be stably and rigidly supported, a condition difficult to maintain in a removable assembly.

SUMMARY OF THE INVENTION

Accordingly, it is an object of the present invention to provide a hood or gatherer sheet assembly for a row crop harvesting header which overcomes problems of known gatherer sheet assemblies, some of which are described above and in particular one which provides convenient occasional access to row unit components which are normally shielded by it, without removal of the gatherer sheet assembly from the machine and one which maintains its structural integrity with minimum deflection under loading imposed by crop material passing over it while in an operating position.

A gatherer sheet assembly arrangement according to the invention may comprise opposite left and right-hand gatherer sheet assemblies, each supported by the sub-frame of a row unit of the harvester header and having an inner edge closely adjacent to and approximately parallel with a crop material receiving passage of the row unit and having an upper surface extending or flaring outwardly and upwardly to an approximately fore-and-aft extending outer edge. The outer edges of juxtaposed respective right and left-hand gatherer sheet assemblies of adjoining row units substantially register one with another when those units are in the same vertical adjustment but terminate so as to define a narrow fore-and-aft extending gap between the gatherer sheets. The gap may be small so that (with the gatherer sheet assemblies in operating position) the juxtaposed respective right and left-hand gatherer sheet assemblies together form a rigid hood or gatherer sheet arrangement substantially spanning the space between the crop material passageways of adjoining row units and cooperating with conveyors provided in the row units in controlling and guiding the movement of crop material. In accordance with the invention, crop material may be divided and guided onto the surfaces of the gatherer sheet assemblies by a divider point carried ahead of them and pivotally mounted at its opposite rearward sides, each side being carried by the sub-frame of one of a pair of adjoining row units so that the divider point spans a forward portion of the space between the crop material passageways of adjoining row units and is shaped so that it overlaps somewhat upwardly and outwardly the forward edges of the side-by-side respective right and left-hand gatherer sheet assemblies.

It is a particular feature that each gatherer sheet assembly is supported by a sub-frame of the row unit adjacent its inner edge for pivoting movement about an axis approximately parallel to the crop material passageway of the row unit. It is an advantage that such support stabilizes the inner edge of the gatherer sheet assembly so as to maintain a pre-determined desirable relationship of the edge to the crop material passageway. It is in keeping with the invention that the construction of the gatherer sheet assembly, including the inner edge, may be such as to reinforce and stiffen the inner edge so as to augment the stability provided by the pivotal connection between the gatherer sheet assembly and the row unit sub-frame.

It is another feature of the invention to provide support towards the outer edges of each gatherer sheet assembly by means of structural members forming part of or attached to the row unit sub-frame. It is a further feature that portions of the structural members may include or form or constitute latching elements registerable and engagable with matching latching elements carried by the gatherer sheet assembly, for example, on its underside. Preferably, the latching elements function automatically responding to upward pressure on the gatherer sheet assembly to disengage and permit upward swinging of the gatherer sheet assembly about its pivotable inner edge support into an access position. Responsive to downward pressure, for example, following contact between the matching latching elements at the completion of downward movement of the gatherer sheet assembly, the elements may latch automatically to latch and secure the assembly in an operating position.

It is a feature of the invention that the form of the opposite left and right-hand gatherer sheet assemblies of a given row unit and the disposition of the axes of their pivotable attachment to the row unit sub-frame are such that, in an access position providing convenient and substantially unrestricted access to row unit components, a gatherer sheet assembly may be supported stably, relying only on gravity to maintain it in that position, supported by the engagement of a portion of its upper surface with that of its mating gatherer sheet assembly which may be secured in its operating position.

It is an advantage of the invention that the juxtaposed respective right and left-hand gatherer sheet assemblies of adjoining row units may, if desired, both be placed in the access position at the same time thus providing even greater accessibility to the components of the row units thus exposed. Another advantage of a gatherer sheet assembly, according to the invention, is that the stability provided to the assembly by the inner pivoting support and the outer latching support makes it feasible to reduce the nominal gap between the outer edges of the juxtaposed gatherer sheets so as to minimize losses of crop material through the gap while maintaining the freedom of vertical floating movement of adjoining row units without the risk of interference between the adjacent or juxtaposed outer edges of the gatherer sheet assemblies.

It is an advantage of the invention that gatherer sheet assemblies may be released for access and re-secured for field operation quickly and conveniently, without tools, and with a minimum of manual effort and risk and without the inconvenience of detachable parts or hardware which may become misplaced. It is in keeping with the invention to be used in combination with a forward mounted gatherer divider point somewhat overlapping a forward portion of the gatherer sheet assembly arrangement but readily releasable for downward pivoting movement to permit movement of gatherer sheet assemblies from the operating to the access positions.

DESCRIPTION OF THE PREFERRED EMBODIMENT

Figure 1:
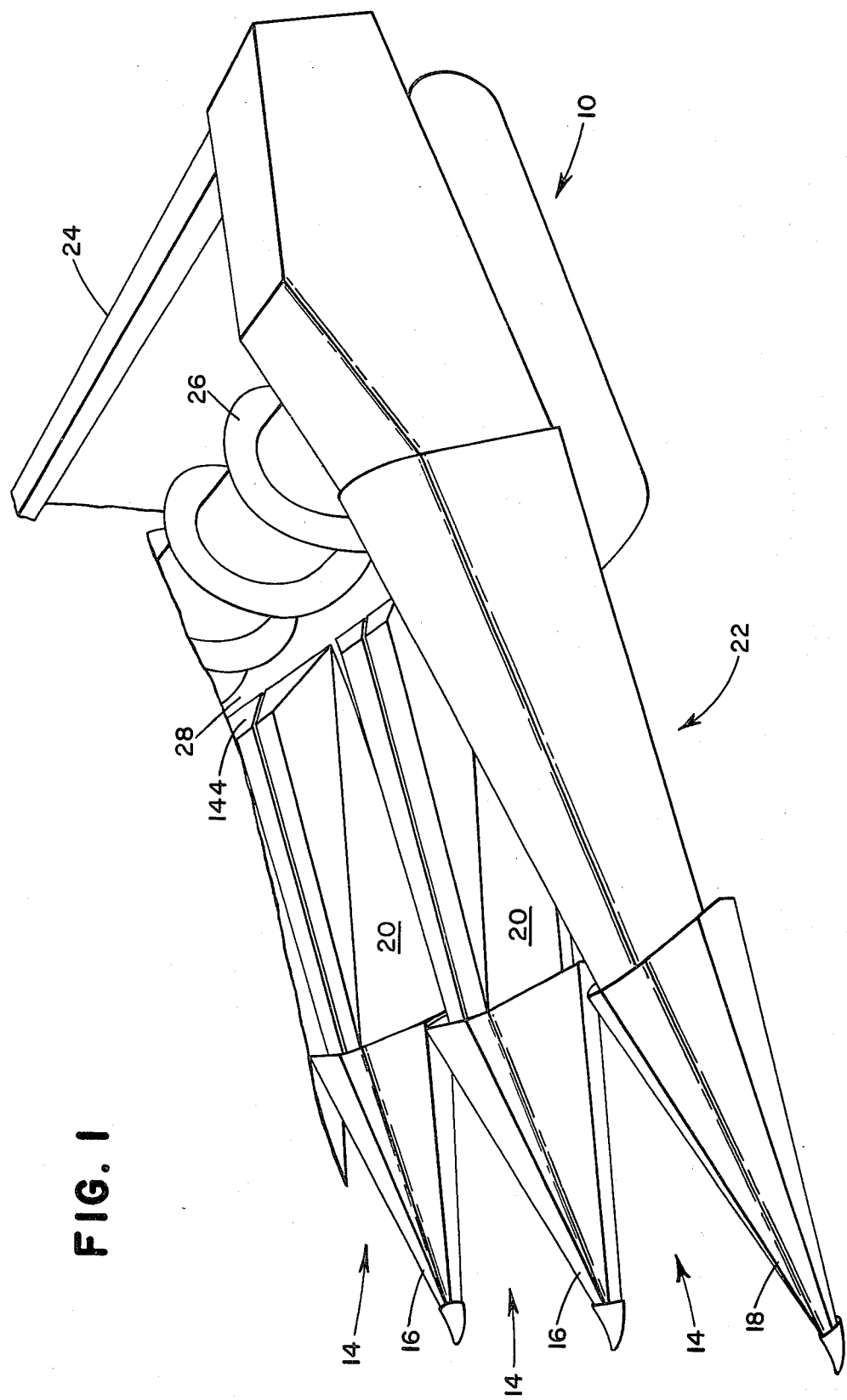
FIG. 1 is a partial left front three quarter perspective view of a row crop harvesting header embodying the invention.

The invention is embodied in an improved row crop harvesting header of the type of which only a left-hand portion is shown in FIG. 1. The structure and function of such a machine is described in some detail in U.S. Pat. No. 3,982,384, referred to above, and such aspects of the machine will be described only briefly here.

It is well known that a row crop harvesting header or head is a particular form of gatherer for mounting at the front of a feeder house of a combine harvester such as a conventional self-propelled combine. Such heads sever crop material from the field as the combine advances, converge the material, and deliver it to the feeder house which in turn conveys it to the combine processing unit, usually including means for threshing, separating, and cleaning the crop.

Figure 2:
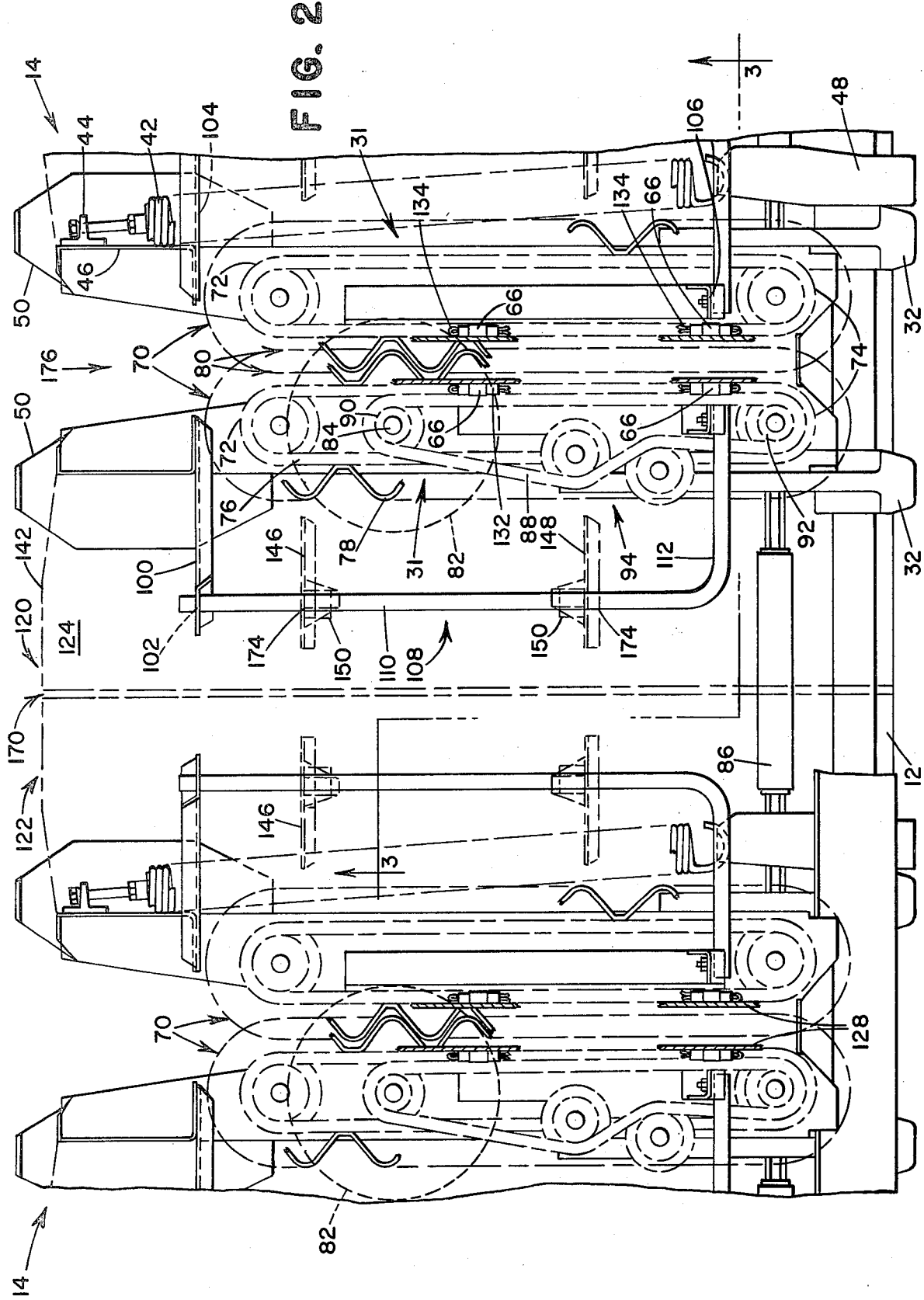
FIG. 2 is an enlarged overhead view partially showing a pair of adjoining row units with the gatherer sheet assemblies shown in phantom outline only.

The row crop head is provided with a main frame indicated generally by the numeral 10 in FIG. 1 which includes a transversely extending main beam 12 substantially spanning the head and seen best in FIG. 2. The main beam 12 supports a plurality of side-by-side forwardly extending row units 14. Various sizes of row crop head are available to suit combine size and capacity and the left-hand end portion of row crop head shown in FIG. 1 may, for example, be that of a six or eight row size. In operation, the machine is advanced in a field with the center of each row unit aligned with a row of crop and sheet metal guiding and deflecting surfaces cooperate with functional components (to be described later) of the row units 14 to lead crop material into the machine. The guiding and deflecting surfaces provided include, as shown in FIG. 1, between each row forward mounted divider points, such as the plurality of inner divider points 16 and pair of opposite left and right-hand outer gatherer points, the left-hand 18 only being shown. More guiding and deflecting surfaces are provided rearward of the divider points 16 and 18 by a plurality of gatherer sheet assembly arrangements including a hood assembly or pair of intermediate gatherer sheet assemblies 20 and opposite left and right-hand outer gatherer sheet assemblies, only the left-hand 22 of which is shown. As indicated in FIG. 1 by left-hand outer gatherer sheet assembly 22, the outer gatherers extend rearward of the hood assemblies 20 and a generally upright sheet metal rear wall 24 extends between their rearward ends. A transversely extending helicoid conveyor auger 26 extends between the opposite outer gatherer sheets immediately ahead of the rear wall 24. The elongated box or trough-like form defined by the rearward ends of the hood assemblies 20, the rear wall 24, and the outer gatherer sheets such as the left-hand gatherer 22 shown, is provided with a floor 28 closely spaced below the auger 26.

All the row units 14 are substantially the same and only one will be described here. Each row unit 14 (FIGS. 2 and 3) includes a row unit frame 30 attached to the main frame transverse beam 12 by a pair of mounting bracket assemblies 32 which provide for pivoting movement of the row unit 14 about a transverse axis and are also laterally adjustable on the main beam 12 to vary the spacing between row units to suit the spacing of rows of crop to be harvested.

Figure 3:
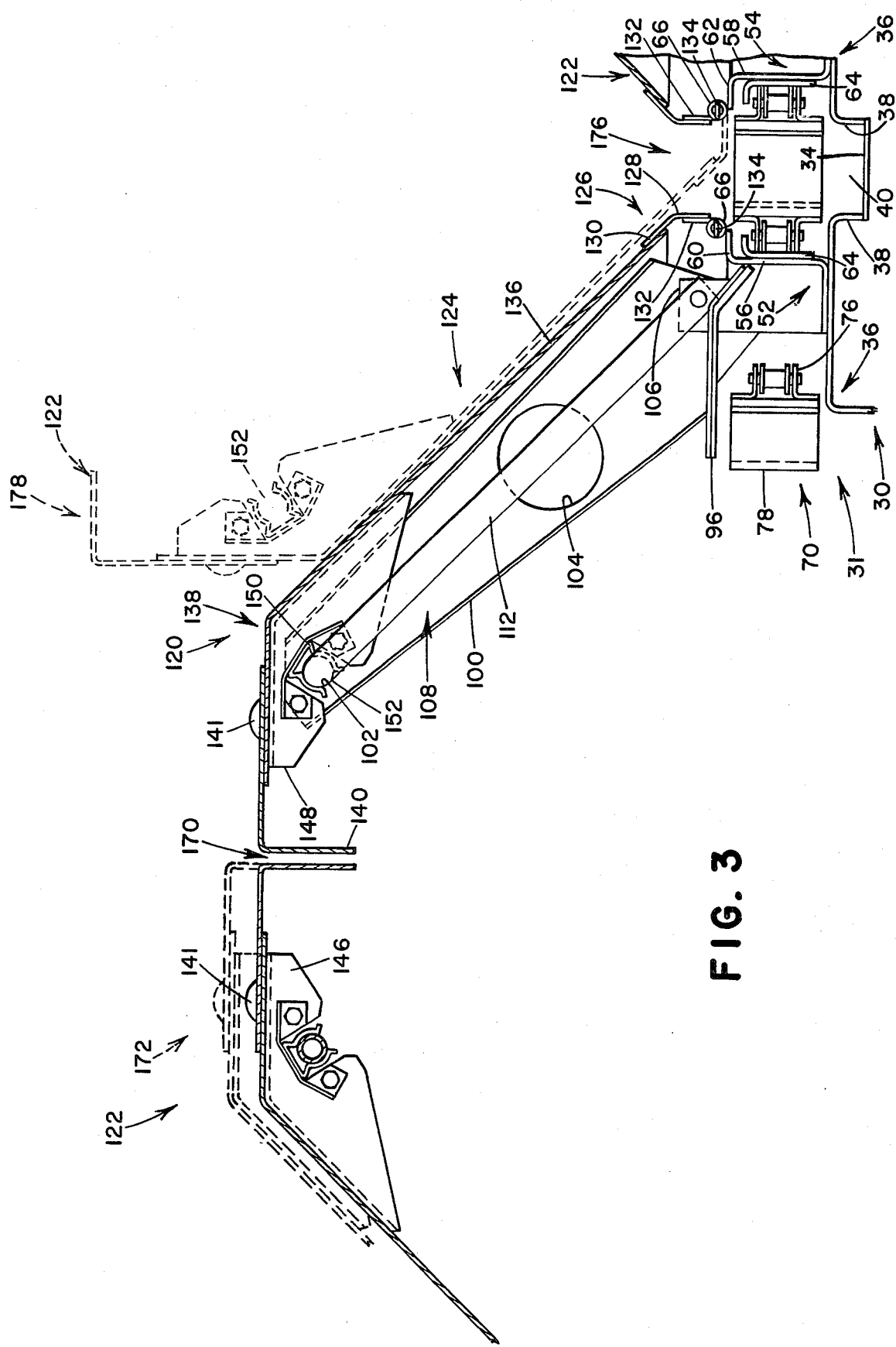
FIG. 3 is a simplified cross-sectional somewhat schematic view approximately on line 3—3 of FIG. 2 showing the configuration of the gatherer sheets and their relationship to the crop material passageway.

Each row unit frame 30 includes a pair of laterally spaced generally downwardly and forwardly inclined frame arms 31 and a central plate 34 seen best in FIG. 3 and a pair of inverted U-shaped members 36 forming part of each arm 31 welded on top of the plate 34 adjacent its opposite lateral edges, opposite inner legs 38 of the U-shaped members 36 and the top of the frame plate 34 forming a fore-and-aft trough 40.

A float spring 42 extends between a forward spring bracket 44 rigidly attached to a forward extension 46 of the U-shaped member 36 in each right-hand frame arm 31 and a spring support arm 48 extending upwards from the main beam 12. The spring 42 is selectively adjustable to support a part of the weight of the row unit 14. A ground contacting skid shoe 50 is pivotally supported on the underside of each extension bracket 46 at the forward end of the row unit frame 30.

Mounted rigidly on the upper side of the U-shaped members 36 are a pair of elongated fore-and-aft extending approximately Z-shaped guide support plates or rail assemblies 52 and 54 respectively. Each rail assembly has an upright wall, 56 and 58 respectively, and an upper flange, 60 and 62 respectively, facing each other and disposed above and somewhat outside the walls of the trough 40 formed by the inner legs 38 of the U-shaped members 36. Preferably, the inner facing opposite walls 56 and 58 of the rail assemblies 52 and 54 are provided with elongated wear plates such as those indicated at 64. A pair of hinge elements or bushings 66, spaced from each other and coaxial are attached rigidly to the inner edges of each of the rail assembly flanges 60 and 62.

Functional components of each row unit 14 include a pair of fore-and-aft extending intermeshing flexible conveyors 70 trained around fore-and-aft sprockets 72 and 74 respectively each including a steel roller chain assembly 76 carrying a broad, puckered, or gathered belt member 78 and disposed so that opposite inner runs 80 intermesh and extend above and parallel to the trough 40. A rotating knife indicated only in FIG. 2 and only by the circular peripheral path 82 described by a knife tip as it rotates, is carried on an upright spindle 84, in the left-hand arm 85 of each row unit and disposed to sever crop material close to the forward end of and below the conveyors 70 so that it can be carried rearward by the conveyors. Drives to the flexible conveyors 70 and the rotating knife 82 are conventional and include a transverse drive shaft 86 spanning the row crop head and receiving power from a power source on the combine (not shown) and transmitting it by means of a drive chain 88 to a knife drive sprocket 90 on the knife spindle 84 and a driven sprocket 92 coaxial with the rearward sprocket 74 of the flexible conveyor 70. A conventional double sprocket chain tightener 94 is provided for the drive chain 88. Drive members are supported by conventional frame members and brackets such as the drive support plate 96 shown in FIG. 3.

Part of the support for each hood assembly 20 is provided by a pair of opposite forward hood rail support brackets 100 each attached to a forward portion of an opposite row unit frame arm 31 and extending outwards and upwards in relation to the central passage of the row unit. Each bracket 100 includes a rail support hole 102 near its upper end and a clearance hole 104 for the spring 42. A smaller upright rear hood rail bracket 106 is rigidly attached to the row unit frame close to its junction with the mounting means 32. A hood support rail 108, generally L-shaped, has a long fore-and-aft extending portion 110 entering the rail hole 102 of the forward bracket 100 and a shorter leg 112 extending outward and upward from and rigidly attached to the rear hood rail bracket 106.

Each row unit 14 carries a pair of equal and opposite left and right-hand gatherer sheet assemblies 120 and 122 respectively. The gatherer sheet assemblies 120 and 122 are formed and disposed so that between each pair of adjoining row units 14 the juxtaposed respective right and left-hand gatherer sheet assemblies 122 and 120 cooperate to form a hood assembly 20. The gatherer sheet assembiles 120, 122 are mirror images of each other so that only one, the left-hand 120 for example, need be described. It includes a gatherer sheet portion indicated generally by the numeral 124 and a crop guide portion 126, preferably of heavier material and seen best in FIG. 3. The crop guide 126 includes an upright wall 128 in vertical alignment with one of the walls 38 of the trough 40 and an outwardly and upwardly sloping flange portion 130. Rigidly attached at spaced positions along the lower edge of the wall 128 and registering with the hinge elements 66 are a pair of gatherer sheet hinges 132, the respective mating hinge portions 66 and 132 being pivotally secured together by suitable pin means such as the cotters 134 shown in FIG. 2.

The gatherer sheet portion 124 includes a generally fore-and-aft extending and outwardly and upwardly sloping portion 136, overlapping and rigidly attached at its bottom edge to the flange 130 of the crop guide 126, a flat top portion 138, and an upright fore-and-aft extending and depending outer wall portion 140. The top portion 138 comprises overlapping sections clamped together by fasteners 141 and suitably slotted to permit lateral adjustment according to row spacing. Forward edges of the gatherer sheet portion 124 are indicated generally by the numeral 142 and a sloping rear wall portion 144 completes the definition of the guiding and deflecting surfaces of the gatherer sheet assembly 122. Longitudinally spaced forward and rear latch gussets 146 and 148, respectively rigidly attached, for example, by spot welding to the inside of the gatherer sheet 124 and spanning the junction between the sloping and top portions 136 and 138 respectively, each support a spring clip 150 having a yieldable opening 152 facing generally downwards and outwards. The latch gussets 146, 148 also contribute to the structural stability of the gatherer sheet assembly 120. The views of gatherer sheet assembly 122, the support rail 108 have been simplified in FIGS. 3 and 4 for clarity. Typically, the gatherer sheet assembly is more complex in form as indicated in FIG. 2.

Figure 4:
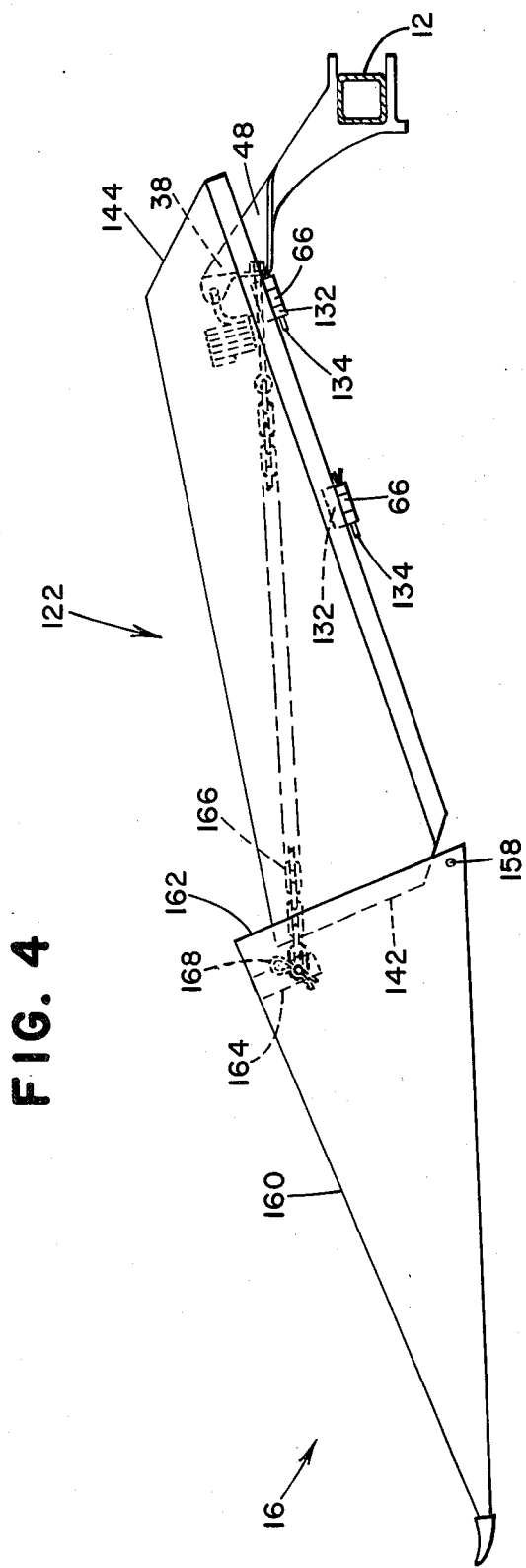
FIG. 4 is a semi-schematic smaller scale left-hand partial side view of a gatherer sheet assembly and forward divider point.

The outer divider points such as the left-hand point 18 are essentially conventional but the inner divider points 16 will be described in some detail. As indicated in FIG. 4, each is pivotally supported by a pair of opposite pivots, of which only the left-hand 158 is shown, carried on a forward portion of the arms 31 of the row unit frame 30 and includes a somewhat frusto-conical divider sheet 160 diverging rearwardly and having a rearward edge 162 normally longitidinally overlapping the forward edges 142 of the juxtaposed right and left-hand gatherer sheet assemblies 122 and 120 respectively of adjoining row units 14. A chain support bracket 164 is rigidly attached inside an upper central portion of the divider sheet 160 towards its rearward edge 162. A divider support chain 166 secured to one of the spring support posts 48 at its rearward end is releasably attached to the chain bracket 164 in the divider point 16 by appropriate means such as the hairpin cotter 168 shown in FIG. 4 and passing through holes in the bracket 164.

The juxtaposed respective right and left-hand gatherer sheet assembiles 122 and 120 of a pair of adjoining row units 14 are shown in FIG. 3 in their working or operating position and with their adjustable top portions 138 adjusted to provide a narrow fore-and-aft extending gap 170 between the outer wall portions 140 so as to permit free relative vertical pivoting movement between the adjoining row units 14, such movement being indicated by the displaced position of one of the gatherer sheets assemblies indicated at 172 in FIG. 3. The gap 170 is preferably adjusted to $\frac{1}{8}$ to $\frac{1}{4}$ inch wide to permit free movement with a minimum loss of crop material through the gap. As shown in FIG. 3 and FIG. 2 taken together, the gatherer sheet assemblies 122 and 120 are secured in the operating position by engagement of the spring latches or clips 150 with spaced portions 174 of the fore-and-aft portion 110 of the hood support rail 108, the engaged rail portions 174, and the clips 150 together constituting the mating portions of a latch.

With the gatherer sheet assemblies 122 and 120 in operating position and with a machine in operation in a field of crop, the opposite upright walls 128 of the crop guide members 126 form the upper portion of a crop receiving and guiding passageway 176 of which the trough 40 constitutes the lower portion and through which the rearwardly and upwardly moving inner runs 80 of the flexible conveyors 70 move, conveying and sweeping crop material which has been severed by the rotating knife 82 as the machine advances. For successful, efficient operation of the row crop head, a smooth and controlled flow of crop material must be maintained to achieve this, a stable relationship between the guiding and deflecting surfaces, as well as the overall configuration of the gatherer sheet assemblies 122 and 120, with the passageway 176 is important. The firm support for the inner edge portion of the gatherer sheet assemblies 122 and 120, defined by the crop guide member 126 is important in this regard and it is preferable also that the crop guide 126 is of heavier material than the gatherer sheet 124 to minimize deflection of the assembly between the hinges 132 or damage to the wall 128 should the gatherer sheet assembly be removed for any reason. The hinges provide not only a hinge function but also firm support and even so use of releasable pins such as the cotters 134 makes removal of the gatherer sheet assemblies 122 and 120 from the row crop head simple and convenient if required.

To gain access for service to functional components of the row unit, for example, to adjust the tightness of the drive chain 88 by means of the tightener assembly 94, or to lubricate the rotary knife spindle 84 or adjust the support spring 42, a gatherer sheet assembly may be hinged upwards through an arc of approximately 90° into an access position as indicated in FIG. 3 at 178 by the removed position of a right-hand gatherer sheet assembly 122. Swinging the gatherer sheet assembly 122 upwards for access is preferably done with the row crop head secured in a somewhat raised position so that the appropriate divider point 16 may be swung downward to provide clearance for the movement of the gatherer sheet assembly 122. Release of the divider point 16 is simply and conveniently effected by removing the hairpin cotter 168 easily accessible by hand, reaching inside the upper rearward edge 162 of the divider sheet 160 for which generous clearance is provided, and lowering the point. Upward pressure on the gatherer sheet assembly 122, for example, by grasping its forward edges 142 releases the latches constituted by the spring clips 150 and the correspondingly engaged latch portions 174 of the support rail 108 so that the gatherer sheet assembly pivoting about the hinges 132 may be swung freely up into the access position at least partially defined or limited by engagement between the sloping portions 136 of the gatherer sheets 124. As can be seen from the drawings, particularly FIG. 3, when the gatherer sheet assembly 122 is in the access position, its bulk is almost wholly to one side of the pivot axis of the hinges 132 so that the gatherer sheet assembly 122 is maintained in the access position by its own weight, its center of gravity being well to one side of the hinge axis. As can be seen from FIG. 3, the access position of the hinged gatherer sheet assemblies 122, 120 provides convenient and generous access to components of the row unit 14 requiring occasional attention. Quick access is achieved without tools and without the inconvenience and risk of damage and loss involved in removing gatherer sheet assemblies from the machine for access. The only "loose" part involved in moving a gatherer sheet assembly from the operating to access positions is the hairpin cotter 168 securing the chain 166 and this part is readily stored by replacing it after disconnecting the chain 166. If desired, the juxtaposed right and left-hand gatherer sheet assemblies, 122 and 120, of adjoining row units 14 may be placed in the access position at the same time thus giving additional access.

To return the gatherer sheet assembly 122 to the operating position, it is swung down until the spring openings 152 of the spring clips 150 register with and engage the latch portions 174 of the support rail 108. Then downward pressure applied to the gatherer sheet assembly 122 causes the clips 150 to yield to allow the latch portions 174 to enter and be grasped by the clips 150, thus securing the gatherer sheet assembly in its operating position.

We claim:

1. In a row crop harvesting header for a harvesting machine adapted to advance over a field of row planted crops and having a transversely elongated main frame, a plurality of transversely spaced row units extending forwardly from the main frame, each row unit including a row unit frame, means mounting the row unit frame on the main frame for independent vertical floating adjustment of the forward end of the row unit, a pair of laterally spaced elements mounted on the row unit frame and defining a generally fore-and-aft passageway adapted to receive a row of crop material as the machine advances, conveyor means mounted on the row unit frame and having opposite rearwardly moving inner runs on opposite sides of the passageway and operative to engage the crop material and move it rearwardly along the passageway and cutting means mounted on the row unit frame generally below the forward end of the conveyor means for severing the crop material relatively close to the ground as the crop material moves rearwardly along the passageway, an improved hood arrangement overlying the space between the adjacent row units to prevent the loss of material between adjacent units, respectively mounted on each pair of adjoining row units and covering the area between the passageways of the adjoining row units comprising:

opposite left and right-hand hood members, each member having an operating position and a passageway edge at least partly forming one of the laterally spaced elements defining the edge of the passageway when the hood member is in the operating position and each hood member being respectively attached to and independently vertically adjustable with the respective adjoining row units;

pivot means connected between each hood member adjacent its passageway edge and the row unit frame for permitting upward pivoting about a pivot axis generally parallel to the passageway into an access position;

a pair of opposite left and right-hand support brackets carried by each row unit frame, each support bracket including a first latching member;

a second latching member carried by each hood member, each second latching member being disposed to engage a first latching member upon downward pivoting of the hood member from the access position and, responsive to downward pressure on the hood member after engagement, to latch the latching members one to the other so that the hood member is secured in the operating position and, responsive to upward pressure on the hood after latching, to release one from another permitting upward pivoting of the hood element into the access position; and a forwardly converging divider member respectively mounted on each pair of adjoining row units and extending forwardly from adjacent hood elements, the forward end of each divider member moving between the adjacent rows as the machine advances.

2. The invention defined in claim 1 wherein the adjacent left and right-hand hood members of adjoining row units are separated from one another by a fore-and-aft extending gap permitting the independent vertical adjustment of the adjacent hood members.

3. The invention defined in claim 1 wherein each divider member is mounted on the respective adjoining row units by a pair of transverse generally aligned pivots respectively carried by the forward end of the adjacent row unit frames and a generally fore-and-aft collapsible link above and generally parallel to the row unit frames, the forward end of the link being manually releasably connected to the divider member above said pivots and the rearward end of the link being connected to the header frame.

4. In a mobile harvester including a processing unit and a header for removing crop material from a field and delivering it to the processing unit, the header including a transversely extending main frame and at least two side-by-side forwardly extending row units pivotally supported by the main frame for independent vertical movement relative to the frame, each row unit having a fore-and-aft sub-frame at least partially defining a generally fore-and-aft channel for receiving standing crop material as the harvester advances, each row unit including a plurality of functional components including a pair of opposite conveyor means flanking the opposite sides of the channel for controlling and advancing crop material in the channel, an improved gatherer sheet arrangement included in each row unit and supported by the sub-frame for supporting and guiding upper portions of the crop material entering the channel and covering at least partially the functional components, comprising:

opposite left and right-hand gatherer sheets assemblies disposed respectively on opposite sides of and substantially above the channel, each gatherer sheet assembly having an approximately fore-and-aft extending inner edge adjacent the channel and an outer edge disposed higher than the inner edge and upper surfaces extending upwards and outwards between the inner and outer edges, the juxtaposed outer edges of the respective right and left-hand gatherer sheet assemblies of adjoining row units being approximately parallel and adjacent to each other when said row units are in the same vertical adjustment so that the juxtaposed upper surfaces of the adjacent left and right-hand gatherer sheet assemblies define an approximately continuous gatherer sheet surface extending from channel to adjacent channel; and each gatherer sheet assembly also including pivot means carried by the gatherer sheet assembly adjacent the inner edge and having an approximately fore-and-aft extending pivot axis and being pivotally connected to the sub-frame, and a releasable latch carried by the gatherer sheet assembly towards the outer edge for grasping a portion of the sub-frame and releasable to permit pivoting of the gatherer sheet assembly between an operating position in which the latch is engaged and an access position in which the latch is released and the gatherer sheet assembly is pivoted upwards from the operating position.

5. The invention defined in claim 4 wherein in each row unit the access position of one gatherer sheet assembly is defined when the other gatherer sheet assembly is in the operating position and the outwardly and upwardly sloping surfaces of the respective gatherer sheets assemblies are in engagement.

6. The invention defined in claim 5 wherein when a gatherer sheet assembly is in the access position, the center of gravity of that gatherer sheet assembly is disposed on the channel side of the pivot of said gatherer sheet assembly so that gravitational force maintains the gatherer sheet assembly in the access position supported by the other gatherer sheet assembly.

7. The invention defined in claim 4 wherein the releasable latch includes spring means responsive to upward pressure on the gatherer sheet assembly for actuating the latch and releasing the gatherer sheet assembly from the operating position for rotation about the pivot axis to the access position.

* * * * *